T. E. AND H. E. ASHBY.
SLED.
APPLICATION FILED JAN. 8, 1917. RENEWED FEB. 16, 1920.

1,353,817.   Patented Sept. 28, 1920.

Inventors
THOMAS E. ASHBY.
HOWARD E. ASHBY.

By Charles E. Wisner,
Attorney

UNITED STATES PATENT OFFICE.

THOMAS E. ASHBY AND HOWARD E. ASHBY, OF WAYNE, MICHIGAN.

SLED.

1,353,817.  Specification of Letters Patent.  Patented Sept. 28, 1920.

Application filed January 8, 1917, Serial No. 141,102. Renewed February 16, 1920. Serial No. 359,203.

*To all whom it may concern:*

Be it known that we, THOMAS E. ASHBY and HOWARD E. ASHBY, citizens of the United States, residing at Wayne, county of Wayne, State of Michigan, have invented a certain new and useful Improvement in Sleds, and declare the following to be a full, clear, and exact description of the same, such as will enable others skilled in the art to which it pertains to make and use the same, reference being had to the accompanying drawings, which form a part of this specification.

This invention relates to sleds, and its object is a sled which can be easily steered and which is provided with means for automatically returning the runners to neutral position upon release of the steering means. Another object of the invention is a sled having the aforesaid characteristics and which is very inexpensive to manufacture. A further object of the invention is a sled having a pair of fixed runners and a pair of movable runners pivotally secured to the forward end of the said fixed runners and yieldable means for holding the movable runners in neutral position. These and other objects and the several novel features of the invention in its preferred form are hereinafter more fully described and claimed and shown in the accompanying drawings in which—

Similar characters refer to similar parts throughout the drawing and specification.

Figure 1:
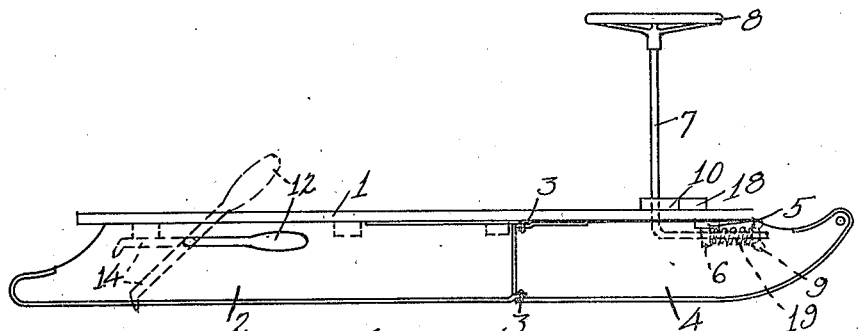
Figure 1 is a side elevation of a sled embodying our invention.

The sled consists of a seat board 1 with a pair of runners 2 fixed thereto and a pair of movable runners 4 are hingedly secured to the fixed runners on the pivots 3. The movable runners 4 are connected by a cross bar 5, each runner being pivoted to the cross bar and movable therewith. An eye 6 is secured so as to swivel at the center of the cross bar 5 and the bent end of the shaft 7 on which the steering wheel 8 is mounted passes through it. The shaft 7 is threaded at the outer end of the bent portion to receive a retaining nut 9 and a spring 19 is provided which seats between the eye 6 and the retaining nut 9 on the shaft 7. The shaft 7 is held in position by a block 10 and a metal bracket 11 which is to be understood as being secured to the under side of the seat board and apertured to receive the shaft 7, which with the block 10, provides a bearing for the shaft. The said block 10 is formed integrally with a foot rest 18 which extends across the sled and makes a brace for the operator's feet, and to make the sled stable three braces 15, 16 and 17 are used.

A brake 12 is provided having a shaft 13 and two rods 14 are also secured thereto. Upon lifting the brake handle 12 to the dotted position shown in Fig. 1, the ends of the rods 14 are forced into the ground and being secured near each runner the entire weight of the persons upon the sled will come upon the brake rods 14, thus making the brake very efficient. Another object in securing the rods 14 to the shaft 13 adjacent the runners is that the rods are secured to the shaft near the bearings thereof in each runner at a point where the shaft cannot spring or will not break as easily as it would were the rods 14 fastened near the center thereof. The method of forming the hinge point shown at 3 is to overlap the two runner irons of the two runners and then rivet them together. In the upper part of each runner pieces of strap iron are secured having overlapping portions and the overlapping portions are pivoted together so that the runner 4 is pivoted to the runner 2 at both top and bottom.

Figure 2:
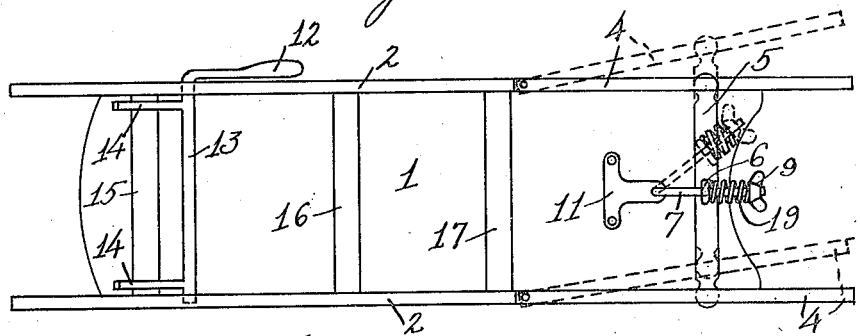
Fig. 2 is a plan view of the under side of the sled.
Figure 3:
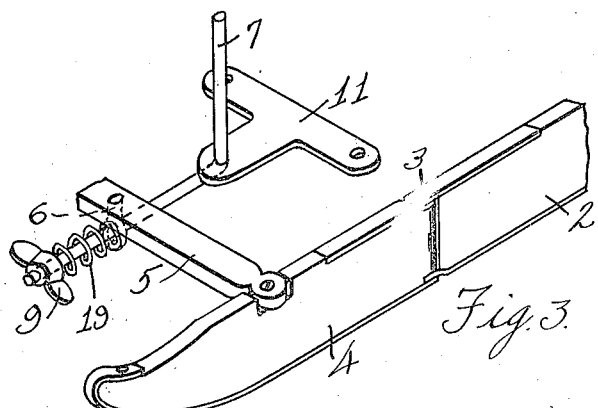
Fig. 3 is a detail in perspective of the apparatus for steering the sled.

Upon turning the wheel 8 the runner 4 will assume a position as shown in dotted lines in Fig. 2. When the wheel 8 is turned the shaft 7 is turned and the bent end thereof and the eye 6 are forced to one side or the other, thus forcing the cross bar 5 and the two runners to which it is pivoted to the position shown in dotted lines in Fig. 2. When the wheel is turned to move the sled in a circle, as will be noticed more particularly in dotted lines in Fig. 2, the spring 19 is compressed between the retaining nut 9 and the screw eye 6 and upon releasing the wheel the spring 19 will tend to expand and thus will force the runners into the position shown in full lines in Fig. 2.

From the foregoing description it becomes evident that the device is of a simple nature and very efficient and convenient in operation, and is also inexpensive to manufacture.

Having thus briefly described our invention, its utility and mode of operation, what we claim and desire to secure by Letters Patent of the United States is—

1. In a sled, a seat board, runners fixed thereto, a pair of movable runners pivoted to the forward end of the fixed runners, means for turning the movable runners consisting of a steering shaft having a bent end, a cross bar connecting the movable runners and pivoted to each runner, an eye pivoted to the cross bar at about the center thereof through which the said bent end extends, said bent end terminating in a threaded portion, a retaining nut thereon and a coiled spring under tension on said bent end between the eye and retaining nut tending to hold the movable runners in neutral position.

2. In a sled, a seat board, runners fixed thereto, a pair of movable runners pivoted to the forward end of the fixed runners, means for turning the movable runners consisting of a shaft having a steering wheel on the upper end thereof, a block on the upper surface of the seat board, and a metal bracket on the under side thereof providing a bearing for said shaft, said shaft terminating in an end bent at a right angle thereto, a cross bar connecting the movable runners and pivoted to each runner, an eye pivoted to the cross bar at about the center thereof through which the said bent end extends, said bent end terminating in a threaded portion, a retaining nut thereon and a coiled spring under tension on said bent end between the eye and retaining nut tending to hold the movable runners in neutral position.

3. In a sled, a seat board, runners fixed thereto, a pair of movable runners pivoted to the forward end of the fixed runners, means for turning the movable runners consisting of a steering shaft having an integral bent end, a cross bar pivotally connected with the two movable runners, the movable runners each having a notch in the upper edge to receive an end of the cross bar, an eye centrally pivoted to the cross bar through which the said bent end of the steering shaft extends, said bent end having a terminal threaded portion, a retaining nut thereon, and a coiled spring under tension on said bent end between the said eye and retaining nut yieldably holding the runners in neutral position.

In testimony whereof we sign this specification.

THOMAS E. ASHBY.
HOWARD E. ASHBY.